G. VINET.
VEHICLE WHEEL.
APPLICATION FILED MAY 31, 1906.
910,612.
Patented Jan. 26, 1909.
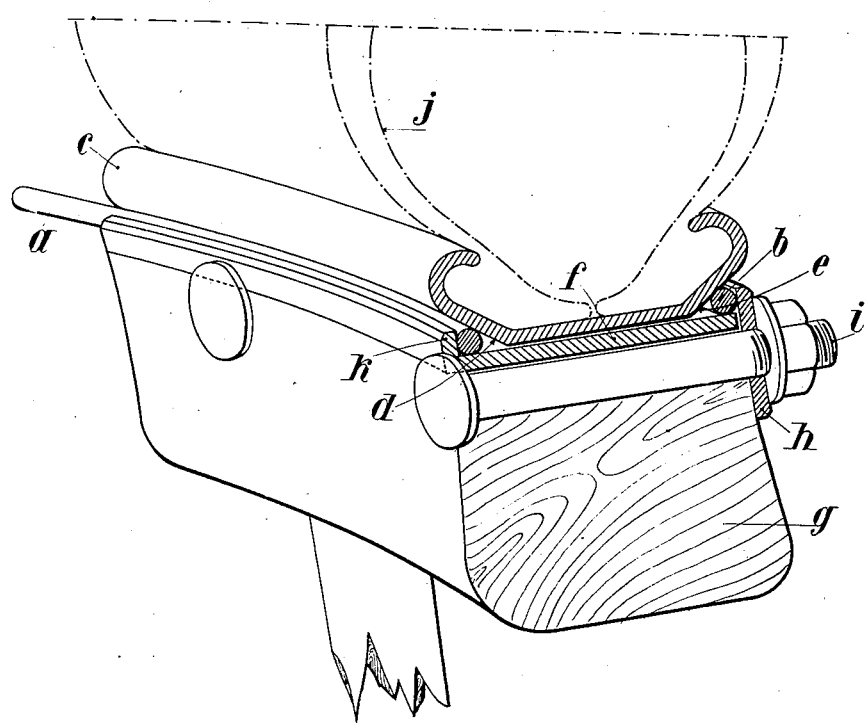

UNITED STATES PATENT OFFICE.

GASTON VINET, OF NEUILLY-SUR-SEINE, FRANCE.

VEHICLE-WHEEL.

No. 910,612.

Specification of Letters Patent.

Patented Jan. 26, 1909.

Application filed May 31, 1906. Serial No. 319,533.

*To all whom it may concern:*

Be it known that I, GASTON VINET, a citizen of the French Republic, residing at Neuilly-sur-Seine, in France, have invented certain new and useful Improvements in Vehicle-Wheels, of which the following is a specification.

This invention relates to improvements in a removable or detachable rim for a vehicle wheel provided with a pneumatic tire already inflated, which can be quickly removed from or placed on a wheel, the tire of which has been punctured.

The main object of the invention is to insure absolute concentricity of the removable rim on the fixed rim of the wheel and it also relates to the method of fixing the movable rim.

In the accompanying drawing is shown a cross section with a perspective view of a movable rim of the said system, mounted on a fixed rim of a vehicle wheel.

This system comprises a movable rim $c$ on which is mounted a pneumatic tire $j$ of any construction. This rim is provided at each side with inclined portions $d$ and $e$. On the other hand, the felly $g$ of the wheel is provided with a metallic hoop $f$ with a flange $k$, the said hoop having a smaller diameter than that of the movable rim $c$. The fixing of the said rim $c$ to the hoop $f$ is effected by means of two lateral wires or cables $a$ and $b$, the development of which corresponds to the outside periphery of the hoop $f$. One of these wires, $a$, rests, when it is put in place on the movable rim $c$, against the flange $k$ of the hoop $f$ and is thus pressed between the said flange and the corresponding inclined portion $d$ of the rim $c$. The second wire $b$ is placed on the edge of the hoop $f$ opposite to the flange $k$, so as to rest against the inclined portion $e$ of the rim $c$ and to be wedged between the said inclined portion, the hoop $f$ and a ring $h$ held strongly applied against the wall of the felly $g$, by the nuts of bolts $i$ which pass through the felly $g$, the heads of which rest against the flange $k$. In this manner the wires $a$ and $b$ are caused to fix the movable rims $c$ concentrically upon the fixed rim $g$, as owing to the pressure exerted by the bolts $i$ upon the ring $h$ the said wires wedge beneath the inclinations upon the rim $c$; this concentric fixing being effected whatever variations may exist in different movable rims both as regards diameter and the inclinations upon the exterior portions against which the wires $a$ and $b$ are compressed.

What I claim is:—

In a vehicle wheel, a felly, a removable rim which carries an inflated pneumatic tire, inclined surfaces upon said rim, endless wires between the felly and the inclined sides of said removable rim and means comprising a flanged hoop and a ring retained by a series of nuts and bolts for causing said endless wires to contact said inclined surfaces and hold the removable rim concentric with the felly.

In testimony whereof I have signed my name to this specification in the presence of two subscribing witnesses.

GASTON VINET.

Witnesses:
HANSON C. COXE,
GEORGES BONNEUIL.